Feb. 21, 1956 P. A. GROBEY 2,735,187
TAPER GAGE
Filed Sept. 11, 1953
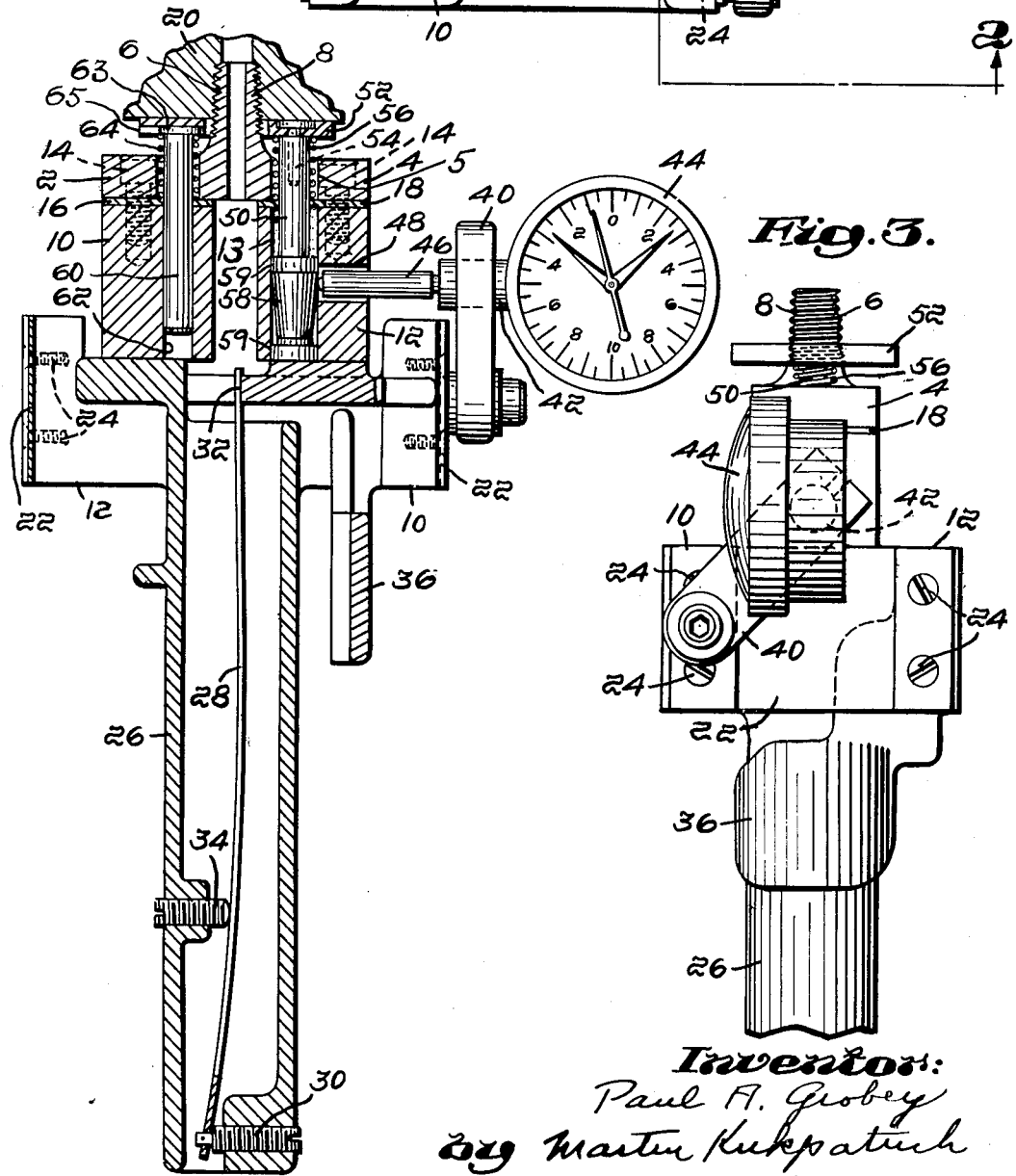
Inventor:
Paul A. Grobey
by Martin Kirkpatrick
Attorney

United States Patent Office 2,735,187
Patented Feb. 21, 1956

2,735,187

TAPER GAGE

Paul A. Grobey, Springfield, Vt., assignor to Bryant Chucking Grinder Company, Springfield, Vt., a corporation of Vermont Application September 11, 1953, Serial No. 379,497

7 Claims. (Cl. 33—174)

This invention relates to gages for measuring tapered work and especially for measuring work having tapered threads, and has for an object to provide an indication on a single dial indicator of the variations at any axial position between the diameter of a tapered workpiece and the diameter of a standard tapered plug or ring.

In manufacturing parts or fixtures furnished, for example, with holes taper threaded for pipe fittings, it is necessary by inspection to establish not only that the thread form is correct but that the threading operation has been carried out to a specified depth. Up to the present time, however, such an inspection has been possible only by means of a gage plug on which a notch was ground at a predetermined position. Such a plug was screwed into the object to be inspected and when the threads were in full mating relationship, said notch was approximately flush with the surface of the object at its large or entrance end. In practice, such operation was both slow and tedious, since a plug not only had to be turned approximately seven turns in to engage and seven turns out to disengage, but the operator "by eye" had to estimate if he was inside the permissible tolerance of, for instance, a thread or two from flush position.

Accordingly, it is a feature of the present invention that complete inspection of a workpiece requires but approximately one-half turn to inspect both the thread form and the tolerance as to depth, resulting in a great saving of time over heretofore known methods of inspecting tapered threads.

For a complete understanding of further objects and features of this invention, reference is made to the following description of a preferred embodiment thereof when read together with the accompanying drawings, in which:

Fig. 1 is a top plan view of an internal gage embodying the invention;

Fig. 2 is a side cross-sectional elevational view of the gage taken on the line 2—2 of Fig. 1; and Fig. 3 is a side elevation of the gage of Fig. 1 with a portion of the handle broken away.

Referring to the drawings, at 2 and 4 are shown two members having taper gage elements 6 and 8 thereon, these gage element mountings being removably secured to support members 10 and 12 by screws 14 and, in effect, forming a part of said support members, said support members comprising a support member 10 having a longitudinally extending hollow handle 26 and a support member 12 movable relative thereto. Metallic washers 16 and 18 are preferably interposed between members 2 and 10, and 4 and 12, respectively. The mountings 2 and 4 with their gage elements 6 and 8 are supported for movement in a plane toward and away from one another for engagement with the sides of a tapered workpiece 20 by means of reeds 22 mounted on the support members by machine screws 24 and connecting the ends of support members 10 and 12. These reeds 22 are of substantial width thus to afford substantial resistance to relative motion of the members longitudinally of the axis of the gage elements 6 and 8 but permitting the gaging elements to be moved toward and away from one another in a direction perpendicular to said axis in a single plane and in a substantially rectilinear direction. A leaf-spirng 28 is shown housed within the hollow handle 26, one end of this spring being supported and restrained by the reduced end of a screw 30 fitted in a hole in the spring and the other end engaging against the edge 32 on the other support member 12; intermediate the ends of the spring 28 it bears against a fulcrum screw 34 on the inner surface of the handle 26 which may be adjusted to balance the pressures of spring 28 and reeds 22. With this arrangement, the spring 28 urges the movable support member 12 to the right relative to the fixed support member 10, as viewed in Figs. 1 and 2. This direction of relative motion of the support members 10 and 12 is that required to move the gage elements 6 and 8 into gaging position against the workpiece 20.

The gage may be operated to permit placing of the workpiece 20 thereon by pressing upon a fingerpiece 36 projecting downwardly from the movable support member 12. During this movement, the gage elements 6 and 8 are pressed toward each other to allow clearance enough for the internal threads of the workpiece to pass over the threads of the gage elements. The above mentioned elements being fully shown and described in Gates et al., U. S. Patent No. 2,588,820 will not herein be further described.

According to this invention, plunger 50 is mounted in a bore 5 on a movable gage element mounting 4, said plunger extending into a bore 13 on movable support member 12 for movement in an axial direction perpendicular to the plane of movement of gage elements 6 and 8. The upper end of said plunger includes a workpiece engaging ring 52 attached to said plunger in a plane perpendicular to the axis thereof by a screw 54, said ring being arranged generally axially of gage elements 6 and 8 and having an inner diameter sufficient to clear gage elements 6 and 8 in their gaging position. A coil spring 56 is provided between ring 52 and a washer 18 for urging said ring 52 into engagement with the end face of workpiece 20. Preferably, the ring 52 is slidingly supported by a guide post 60 extending perpendicular to said ring through fixed gage element mounting 2 and into a close fitting bore 62 in fixed support 10, a spring 64 for urging said ring into contact with workpiece 20 being provided between washer 16 and head 63 of post 60, said head 63 fitting snugly in a radial slot 65 in the lower face of ring 52 permitting said ring 52 transverse freedom of movement in one radial direction only.

The lower portion of plunger 50 is provided with a taper 58 of circular cross-section corresponding to the taper of gage elements 6 and 8 and in a direction effective to cancel said gage element taper as the plunger 50 is moved by workpiece 20, said plunger having expanded portions 59 fitting closely within bore 13 to guide said plunger for movement perpendicular to the plane of movement of said gage elements, said expanded portions also serving to limit the movement of said plunger by contact with washer 18 and the end of bore 13. The fixed support member 10 is provided with a lateral extension 40 having a split bearing to receive and clamp the stem covering sleeve 42 on a dial indicator 44 having suitable plus and minus tolerance hands as well as an indicator pointer, the stem 46 of said dial indicator 44 extending perpendicularly to said plunger 50 through a bore 48 in movable support member 12 and engaging the plunger taper 58. The plunger taper 58 and the end of indicating gage stem 46 thus provide a compensating camming means interposed between the plunger 50 and the dial indicator 44 so that the dial indicator 44 is simultaneously responsive both to the relative positions of gage elements 6 and 8 and the position of said plunger as controlled by the end face of workpiece 20, resulting in the cancelling of the taper of the gage elements 6 and 8 so that the indicator 44 indicates only errors in the diameter of a tapered workpiece.

Since the gage element mountings 2 and 4 are removably mounted on support members 10 and 12 by screws 14, they may readily be changed in order to permit the use of a variety of gage elements. The plunger 50 itself need only be changed when the degree of taper of the gage elements 6 and 8 is changed, and in such case preferably the unit comprising plunger 50 and ring 52 is replaced by a unit having a plunger with a taper corresponding to that of the gaging elements to provide taper cancellation as described above.

In operation, the gage of my invention is first adjusted by means of an internal taper-threaded ring of a standard size by passing said ring over the gage elements 6 and 8 and allowing the spring 28 to press the elements into proper gaging engagement with the ring. The tolerance hands are then set to indicate the maximum plus and minus tolerance, and the indicating pointer of the dial indicator 44 set to 0 where it will remain set in any axial position of the standard ring. After setting the gage, any deviations of the indicating pointer from the 0 mark occurring when the internally taper-threaded hole is being measured, will indicate either under or over-size of the threaded hole, the taper thereof being compensated for by my novel gage.

It will be understood by those skilled in this art that other embodiments of my invention may be effectively employed as, for example, for external gaging, without departing from the spirit of my invention or the scope of the appended claims.

I claim:

1. A taper gage, comprising a pair of relatively movable supports, tapered gage elements on said supports for movement in a plane toward and away from one another for engagement with the sides of a tapered workpiece, a plunger mounted on one of said supports for movement in a direction perpendicular to said plane to engage with the end face of said workpiece, a dial indicator mounted on the other of said supports, and compensating camming means interposed between said plunger and said dial indicator, said means having a cam surface corresponding to the taper of said gage elements effective to cancel said gage element taper as said plunger is moved by said workpiece, said dial indicator being simultaneously responsive to the relative positions of said gage elements and the position of said plunger.

2. A taper gage comprising a pair of relatively movable supports, a tapered gage element on each of said supports for movement in a plane toward and away from one another for engagement with the sides of a tapered workpiece, a plunger mounted on one of said supports for movement in a direction perpendicular to said plane to engage with the end face of said workpiece, said plunger having a taper corresponding to the taper of said gage elements, and a dial indicator mounted on the other of said supports and engaging said plunger taper, said dial indicator being simultaneously responsive to the relative positions of said gage elements and the position of said plunger.

3. A taper gage comprising a pair of relatively movable supports, a tapered gage element on each of said supports for movement in a plane toward and away from one another for engagement with the sides of a tapered workpiece, a plunger mounted on one of said supports for movement in a direction perpendicular to said plane to engage with the end face of said workpiece, said plunger having a taper corresponding to the taper of said gage elements and in a direction effective to cancel said gage element taper as said plunger is moved by said workpiece, and a dial indicator mounted on the other of said supports and engaging said plunger taper, said dial indicator being simultaneously responsive to the relative positions of said gage elements and the position of said plunger.

4. A taper gage comprising a pair of relatively movable supports, a tapered gage element on each of said supports for movement in a plane toward and away from one another for engagement with the sides of a tapered workpiece, a plunger mounted on one of said supports for movement in a direction perpendicular to said plane to engage with the end face of said workpiece, said plunger having a taper corresponding to the taper of said gage elements, means for urging said plunger into engagement with said end face, and a dial indicator mounted on the other of said supports and engaging said plunger taper, said dial indicator being simultaneously responsive to the relative positions of said gage elements and the position of said plunger.

5. A taper gage comprising a pair of relatively movable supports, a tapered gage element on each of said supports for movement in a plane toward and away from one another for engagement with the sides of a tapered workpiece, a plunger mounted on one of said supports for movement in a direction perpendicular to said plane to engage with the end face of said workpiece, said plunger having a taper corresponding to the taper of said gage elements and in a direction effective to cancel said gage element taper as said plunger is moved by said workpiece, spring means for urging said plunger into engagement with said end face, and a dial indicator mounted on the other of said supports and engaging said plunger taper, said dial indicator being simultaneously responsive to the relative positions of said gage elements and the position of said plunger.

6. A taper gage comprising a pair of relatively movable supports, a tapered gage element on each of said supports for movement in a plane toward and away from one another for engagement with the sides of a tapered workpiece, a plunger including a ring arranged in a plane perpendicular to the axis of said plunger mounted on one of said supports for movement in a direction perpendicular to said plane to engage said ring with the end face of said workpiece, said plunger having a taper corresponding to the taper of said gage elements and in a direction effective to cancel said gage element taper as said plunger is moved by said workpiece, a guide post mounted on the other of said supports for movement in a direction perpendicular to said plane to engage with said ring, spring means for urging said plunger and said ring into engagement with said end face, and a dial indicator mounted on the other of said supports and engaging said plunger taper in a direction perpendicular to said plunger, said dial indicator being simultaneously responsive to the relative positions of said gage elements and the position of said plunger.

7. A taper gage comprising a pair of relatively movable supports, a tapered gage element on each of said supports for movement in a plane toward and away from one another for engagement with the sides of a tapered workpiece, a plunger including a ring having a radial slot and arranged in a plane perpendicular to the axis of said plunger mounted on one of said supports for movement in a direction perpendicular to said plane to engage said ring with the end face of said workpiece, said plunger having a taper corresponding to the taper of said gage elements and in a direction effective to cancel said gage element taper as said plunger is moved by said workpiece, a guide post mounted on the other of said supports for movement in a direction perpendicular to said plane to engage with said ring slot, spring means for urging said plunger and said ring into engagement with said end face, and a dial indicator mounted on the other of said supports and engaging said plunger taper in a direction perpendicular to said plunger, said dial indicator being simultaneously responsive to the relative positions of said gage elements and the position of said plunger.

References Cited in the file of this patent

UNITED STATES PATENTS

| | | |
|---|---|---|
| 1,625,462 | Frauenthal | Apr. 19, 1927 |
| 2,411,292 | Rappl | Nov. 19, 1946 |
| 2,435,268 | Childs | Feb. 3, 1948 |
| 2,581,001 | Cornell | Jan. 1, 1952 |
| 2,588,820 | Gates | Mar. 11, 1952 |
| 2,661,542 | Bean | Dec. 8, 1953 |